United States Patent

[11] 3,583,731

[72] Inventor David E. Jewell
       Littleton, Colo.
[21] Appl. No. 876,180
[22] Filed Nov. 24, 1969
[45] Patented June 8, 1971
[73] Assignee The Gates Rubber Company
       Denver, Colo.
       Continuation of application Ser. No.
       710,152, Mar. 4, 1968, now abandoned.

[54] CONDUIT CONNECTORS
     10 Claims, 18 Drawing Figs.
[52] U.S. Cl. .................................................. 285/85,
                                  285/91, 285/325, 285/362
[51] Int. Cl. ............................................... F16l 19/00
[50] Field of Search .......................................... 285/362,
                                             377, 91, 351, 325, 85

[56] References Cited
     UNITED STATES PATENTS
     528,929   11/1894  Doster ........................ 285/362X

| | | | |
|---|---|---|---|
| 554,666 | 2/1896 | Feltner ........................ | 285/DIG.2 |
| 656,956 | 8/1900 | Eibee ........................... | 285/DIG.2 |
| 1,778,739 | 10/1930 | Wheaton ..................... | 285/362X |
| 1,997,858 | 4/1935 | Clawson ...................... | 285/362 |
| 2,317,729 | 4/1943 | Bruno ........................... | 285/377 |
| 2,428,143 | 9/1947 | Chavayda .................... | 285/351X |
| 2,511,495 | 6/1950 | Crot ............................. | 285/351X |
| 2,933,334 | 4/1960 | De Moude .................... | 285/325 |
| 3,404,365 | 10/1968 | Obeissart ...................... | 285/377X |

FOREIGN PATENTS

| | | | |
|---|---|---|---|
| 1,026,065 | 1/1953 | France ......................... | 285/362 |
| 755,095 | 8/1956 | Great Britain ............... | 285/362 |

*Primary Examiner*—Thomas F. Callaghan
*Attorney*—Raymond Fink

ABSTRACT: A manifold connector for connecting female and male portions of a conduit utilizing a rotatable cam ring to engage wedged teeth on a male conduit end portion thereby axially sealing the male and the female conduit end portions into a coacting relationship of one another.

INVENTOR.
DAVID E. JEWELL
BY Raymond Fink
ATTORNEY

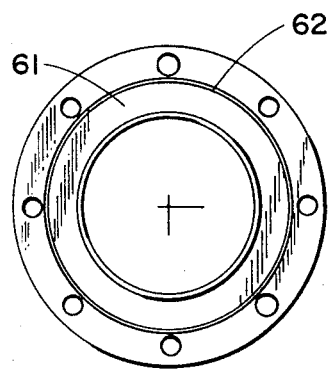
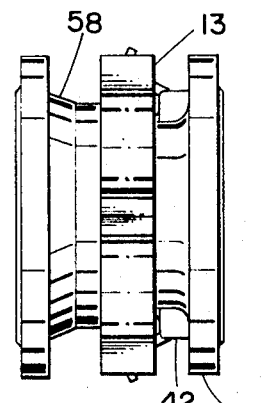
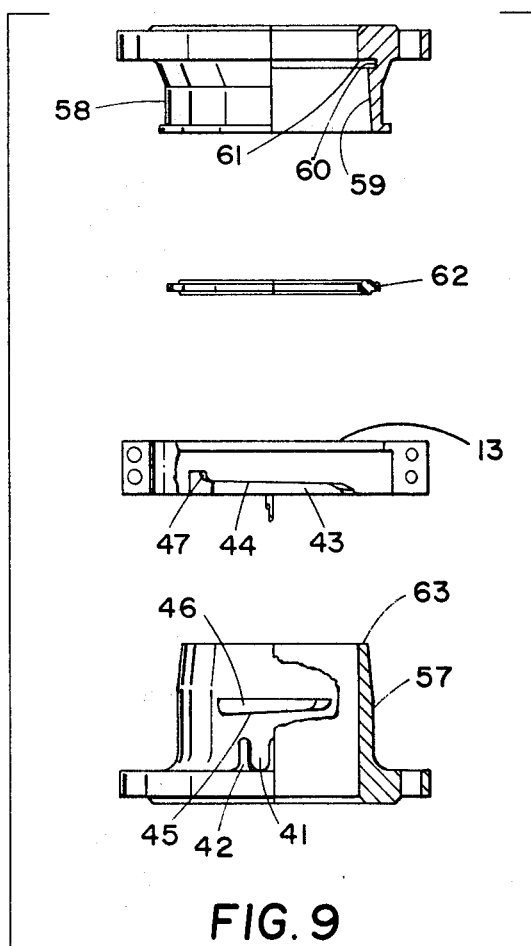
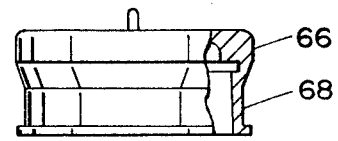
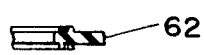
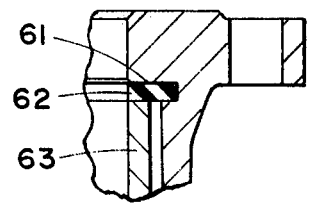

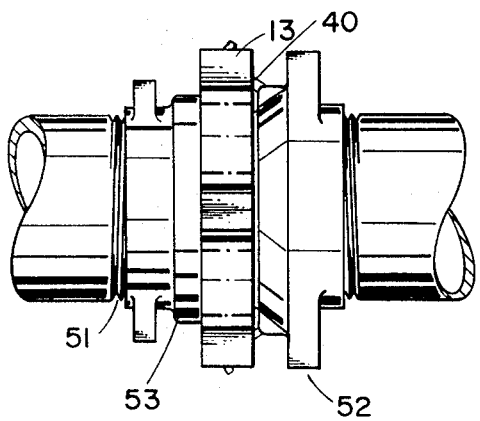
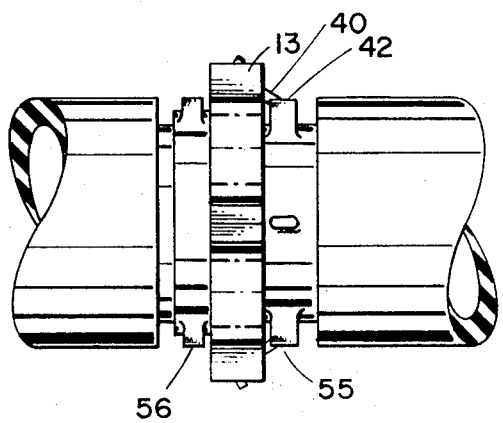
FIG. 13    FIG. 14
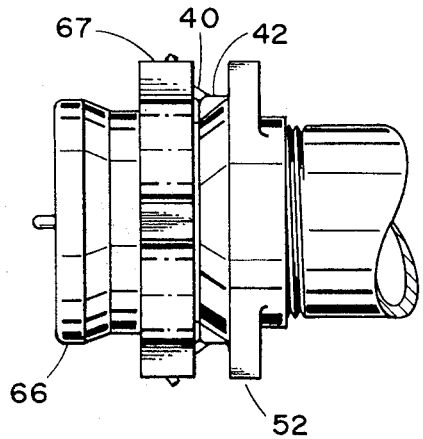
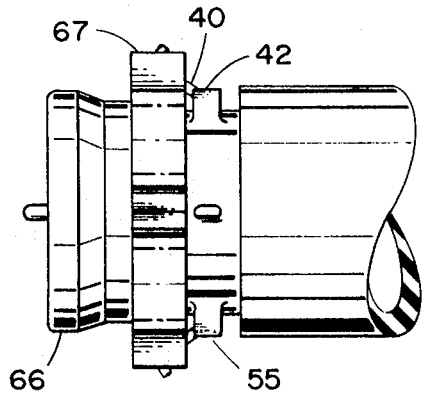
FIG. 15    FIG. 16
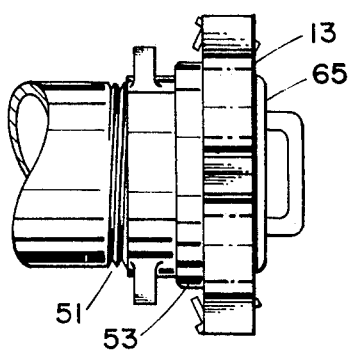
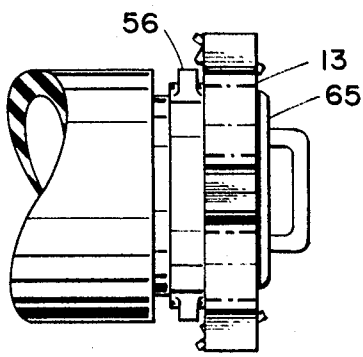
FIG. 17    FIG. 18
INVENTOR.
DAVID E. JEWELL
BY Raymond Fink
ATTORNEY

CONDUIT CONNECTORS

This application is a continuation of application Ser. No. 710,152 filed Mar. 4, 1968 and now abandoned.

This invention relates to a device for connecting hose ends. More particularly, this invention relates to a device for quick-connecting large heavy hose to manifold flanges.

In industries where hose is frequently used for conveying material, there have been many methods devised for connecting hose to each other and to stationary piping systems. The problem is not so pressing where small, light flexible hose is used. However, where large, heavy, bulky hose is used, the most common method for connecting a hose to a piping system is to build a flanged coupling into the hose. This is typically done by building a hose end around a short pipe nipple then attaching a standard flange to the end of the pipe. This arrangement is commonly known as a hose with a built-in nipple and flange. The flange is then bolted to the manifold flange of the piping system or the flange on another hose. This method involves a great amount of effort and takes a considerable amount of time.

A typical industry which uses a great amount of heavy hose and which is concerned with a more expeditious means of connecting hose is the oil industry, particularly that segment of the industry which transports petroleum products in bulk quantities by means of ships and barges. Because of the size of the barges and vessels and the large volume of material, it is necessary to use many large diameter hose either to load or unload. This means that much time must be spent in connecting such hose to piping manifold.

When a hose coupling flange is connected to a pipe manifold flange, the workmen must expend a great deal of effort in aligning the flanges to insure that the flange faces are parallel and the bolt holes are aligned. To do this, it is necessary to move, twist and force the hose around until the bolt holes are in line and bolts can be placed between the flanges, and the bolts and nuts tightened until the flanges are drawn together tight enough to displace the gasket and furnish a leak proof seal. It is readily apparent that when many connections have to be made, the entire process is extremely time consuming and physically exerting. There is also the equally time consuming procedure of unhooking all connections.

Few methods have succeeded in replacing this time consuming process. At best, the more efficient methods usually utilize adapters which require that the adapter be permanently bolted to a pipe flange. The disadvantage is that some of the manifold flanges can be used only for specific coupling arrangements which reduce the flexibility of the manifold and the adaptability and effectiveness of the loading facility are impaired.

The present invention contemplates the use of interlocking connectors whereby a female connector is constructed to accept a male connector on another conduit end. Once the male connector is inserted within the female adapter, a cam ring is seated on the male portion and a locking ring is rotated to engage locking connectors on the peripheral edge of the male adapter. The locking ring is rotatably secured to the female adapter. Locking pins are provided on the female ring lug to engage ears on the male portion thereby assuring a positive locked seal. Disconnection is accomplished by first releasing the locking device and then turning the ring until the locking lugs of the male adapter are no longer secured.

Therefore, it is an object of this invention to provide a manifold connector which can be used to quickly attach a large hose or other type conduit to a piping manifold.

Another object is to provide a quickly attachable manifold connector which does not require nuts, bolts or clasping devices to be securely fastened to a manifold.

A further object is to provide a quick-acting connector that can be securely fastened and does not leak.

A still further object is to provide a quickly attachable manifold connector that can withstand continuous hose or conduit movement and still remain securely attached and positively sealed.

Another object is to provide a durable long-lasting manifold connector that can perform effectively under severe continuous use.

Other advantages, objects and uses of this invention will become apparent when the following description and illustrations are considered.

FIG. 7 is a side view of a manifold coupler embodied by this invention.

FIG. 8 is an end view of such a manifold connector as shown in FIG. 7.

FIG. 9 is an exploded view of the elements of FIG. 8 along the lines 9–9.

FIG. 10 is a cap used to seal off a hose and utilizing a manifold embodied by this invention.

FIG. 11 is an enlarged portion showing the cross-sectional view of the sealing means which may be used in a manifold connector.

FIG. 12 is an enlarged cross sectional view showing the coaction of a sealing means utilized by the manifold coupler.

Figure 2:
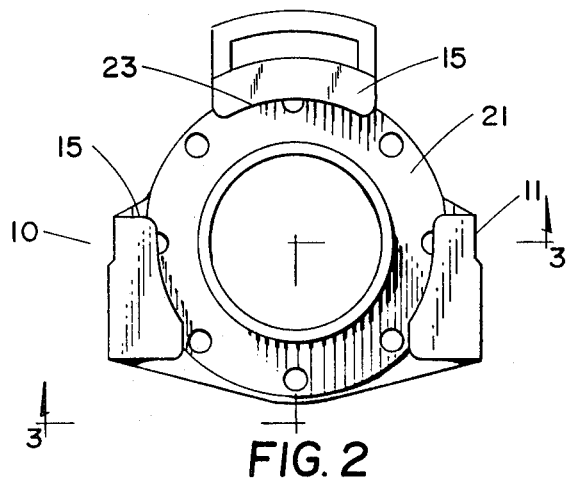
FIG. 2 is an end view of FIG. 1 looking toward the manifold connector.
Figure 1:
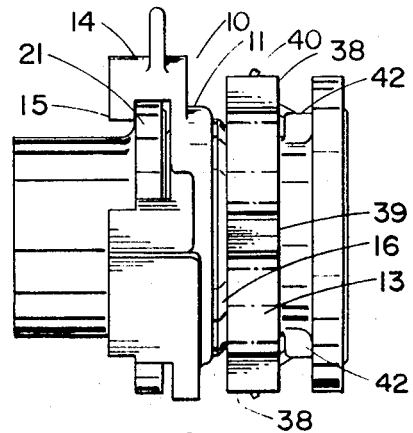
FIG. 1 is a side view of a manifold connector as embodied by this invention.
Figure 3:
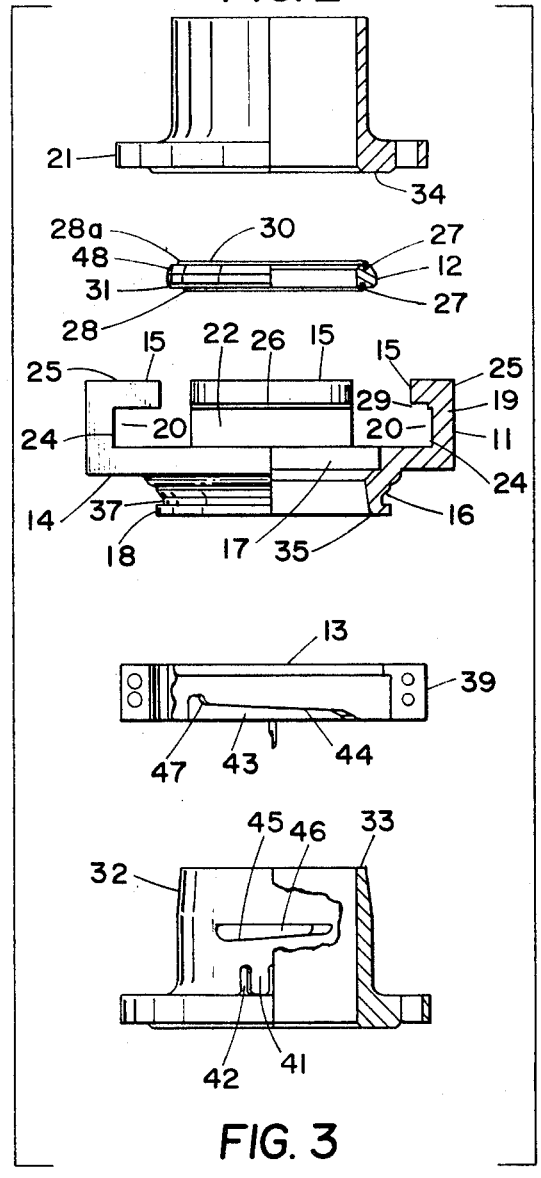
FIG. 3 is an exploded cross section showing the elements of FIG. 2 along the lines 3–3.
Figure 4:
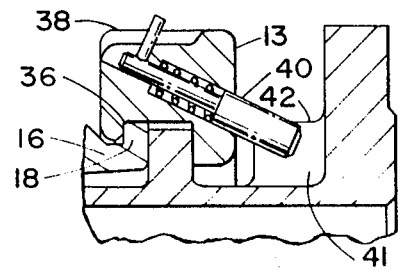
FIG. 4 is an enlarged cross sectional view showing the structure of a locking pin embodied by this invention.
Figure 5:
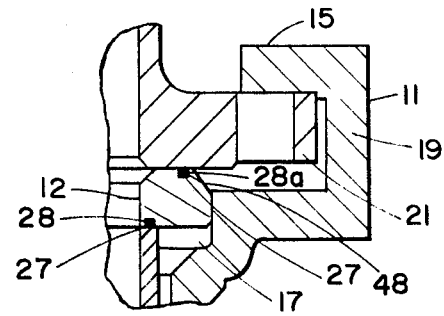
FIG. 5 is an enlarged cross-sectional view showing the sealing means utilized in the manifold connector.
Figure 6:
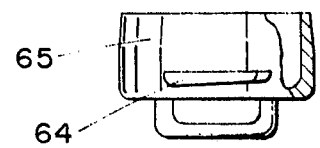
FIG. 6 shows a plug utilizing the elements of this invention which may be used to stop a hose end portion with a coupler utilized by this invention.

FIG. 13 shown threaded manifold nipples utilizing a coupler embodied by this invention to be attached to threaded end portions of conventional conduit ends.

FIG. 14 shows built-in nipples on conduit ends embodying a coupler according to this invention.

FIG. 15 shows a cap to be utilized with a threaded on conduit nipple.

FIG. 16 shows a cap utilized with a built-in conduit nipple.

FIG. 17 shows a plug arrangement utilized with a threaded on conduit nipple.

FIG. 18 shows a plug utilized with a built-in nipple.

The manifold connector 10 is comprised of a housing 11, a seal ring 12, and a connector ring 13.

The main housing body is a metal ring 14 which has grip lugs 15 protruding radially inward from its outer circumference, a connector ring neck 16 disposed axially from its outer surface and a seal ring recess 17 bored into its inner surface and oppositely disposed in an axial direction from the neck.

The connector ring neck 16 is substantially a short section of a pipe which extends from the outer surface of the connector housing 11. The inner bore of the connector ring is of sufficient size to accommodate insertion of a male coupling element. At the end of the connector neck 16 opposite the connector housing is a radial lip 18 which is of sufficient dimension to support and retain axial thrust of a connector ring 13 disposed and assembled over the outside surface of the connector ring neck 16.

The connecting means can be in the form of lugs 15 which are shaped in the form of bent fingers and protrude from the periphery of the connector housing 11 at the inner end or flange end of the manifold connector. The middle portion 19 of the lugs 15 are disposed axially with one end connected to the radially disposed lugs 15 and the lug end which is disposed radially inward toward the connector axis so that the entire lug defines generally the shape of an inverted "U" 20. The lug ends extend radially inward sufficiently to allow adequate grip of a manifold flange 21. This inward extension, however, is limited by the flange neck and outside diameter of a connecting pipe. The length of the inner surface of the middle portion is of sufficient length to enable the lug to be easily slipped over a flange 21. The inner surface 22 of the top lug 23 is formed in the shape of an arc which corresponds to the contour of the flange 21. The inner surface 24 of the side lugs 25 are straight and the distance between the inner surfaces of the side lugs across the inner face of the connector body is sufficient to allow the side lugs 25 to slip radially past the flange diameter.

The length of the lugs through an arc around the flange must be sufficient to provide adequate gripping when the whole connector is assembled. The side lugs 25 must extend sufficiently along the lower end of the flange to enable the connector to distribute the thrust load equally over the flange 21 to insure complete sealing.

The gripping edge 26 of the upper lug 23 preferably is machined so that it has better surface contact with the outer surface of the manifold flange 21. The gripping edges of the side lug ends are also preferably machined to enhance surface contact with the manifold flange. This gripping edge of the side lug end may be undercut in the form of a recess 29 is contoured to fit around the segment of the arc of contact with the flange edge. The resulting pad or ridge made by the recess or undercut is called a locking support pad 29. When the connector is in the assembled position, the upper edge of the locking support pads 29 fits along the contour of the segment of the arc of the flange with the under edge of the manifold flange 21. This ridge or locking support pad prevents the radial movement of the manifold connector when the connector is in an assembled position.

It is not intended to limit the invention to a device which uses lugs. It is obvious that a continuous lip extending from one side to the other of the connector shaped in the same "U" as the lugs would perform the same function as the lugs.

A seal ring 12 is seated in a recess 17 cut in the inner face of the manifold connector 10. The diameter of the recess is dimensioned to allow the seal ring to fit within the recess somewhat loosely. The depth of the recess is dimensioned so that the surface of the seal ring is substantially flush with the inner surface of the manifold connector. The inside face 30 of the seal ring on the face contacting the manifold flange 21 has a beveled edge 48. The edge 31 is beveled to prevent burring, jamming of the connector, or chipping of the seal ring when the manifold connector is lowered over the flange. When the connector 10 is lowered over the flange 21, the beveled edge 48 of the seal ring rides loosely over the sharp edge of the flange 21, allowing the seal ring 12 to be pushed back into the seal ring recess 17. Fitted into grooves 27 on both faces of the seal ring are standard elastomeric O-rings 28 and 28a. The grooves 27 may be standard dovetail grooves, but can be any type which would retain a standard "O" ring.

The inner diameter of the seal ring 12 is preferably the same dimension as the inside diameter of a male element 32 fitted into the inner core of the ring neck 16 and connector housing 11. The proposed objective is to eliminate turbulance through the connector.

The seal 28 on the outer end of the seal ring is dimensional so that the flat butt end 33 of the male element 32 seats against it. The seal 28a on the inner face 30 of the seal ring 12 is dimensioned to a diameter larger than the flange hole in order that the seal 28a seats on the flange surface 34 at a diameter between the bolt diameter of the flange and the flange opening.

At the end of the manifold opposite the seal ring recess 17 is the connector ring neck 16. The connector ring neck 16 protrudes axially from the connector housing 11. At the extreme end opposite the connector housing 11 is a radial lip 18 which extends continuously around the outer circumference of the connector ring neck 16. The lip 18 extends radially outward sufficiently to engage the connector ring 13.

The inside diameter of the connector ring neck 16 is sufficient to allow a male element 32 to fit through and seat on the seal ring 12. The outer edge 35 of the inner bore of the ring neck 16 is rounded to eliminate the chipping of sharp edges when a male element 32 is fitted into the neck 16.

The manifold connector ring 13 is assembled around the outside of the connector ring neck 16 and extends axially with the connector ring neck 16. The connector ring 13 is positioned in such a manner so that it is freely rotatable around the connector ring neck 16. The ring 13 is held in place on the neck 16 by means of a radial lip 18 which extends inward from the body of the connector ring 13 down behind the outwardly extending radial lip 18 of the neck 16. This inward radial lip 18 is continuous around the inner circumference of the connector ring. The inner face 36 of the ring 13 rides in a groove 37 which is defined by the radial lip 18 of the neck 16 and the connector 11.

Protruding radially outward from the periphery of the ring are a plurality of impact lugs 38. These impact lugs 38 are used as a means by which the ring can be made to rotate when the impact lugs 38 are struck with a force means such as a hammer or sledge.

The connecting ring 13 is formed by joining a plurality of arcuate sections which have an ear 39 at each end. The ears 39 in the opposite ends of each section are alternately threaded and bored to permit the sections to be bolted together with the heads of the bolts being counter sunk in the bored portion. When two ears 39 are joined, impact lugs 38 are formed. A typical example, though not a limitation, would result when the connector is made by joining two arcuate sections, both ends having an ear 39 at opposite ends of the section. Each ear 39 is bored and counter sunk to allow a screw or bolt head to be fitted in it. The other end is bored and threaded. When the surfaces of the ears 39 are joined together and the connector is formed, a bolt is threaded through the ears 39 to firmly join the sections. In the center of each section is a fully formed impact lug 38 which protrudes radially from the ring circumference.

In each of alternate impact lugs 38 may be bored holes within which are fitted stop pins 40. The stop pins 40 are disposed so that the axis of the pins angularly converge toward the center of the connector ring 13 in a direction opposite that of the coupling body.

The stop pins engage locking slots 41 which are formed by a plurality of fins 42 disposed radially from the outside of the male element. When the stop pins 40 engage the locking slots 42, the connector ring 13 is restrained from rotating.

Inside the connector ring are positioned a plurality of teeth 43 which have surfaces 44 corresponding to a segment of a helical thread. The helical surfaces 44 of the teeth 43 are on the connector ring 13 facing inwardly toward the connector housing. The helical surfaces 45 of the teeth 46 on a male element 32 face outwardly in the opposite direction of the teeth 43 in the connector ring 13 or away from the connector housing. The teeth 43 in the connector ring and the teeth 46 on the male element are spaced apart so that the teeth 46 of the male element can be fitted between the spaces separating the connector ring teeth 43. When the connector ring 13 is then turned, the helical surfaces 44 of the connector ring teeth 43 ride or are wedged over the corresponding surface 45 of the male element teeth 46. This forces the teeth 46 of the male element behind the teeth 43 of the connector ring in the direction of the connector housing.

Since the connector ring 13 is freely rotatable, the teeth 46 on a male element 32 can be positioned into the connector ring at any position and the connector ring can be rotated until the teeth 46 on the male element fit in the alternate spaces between the teeth 43 of the connector ring allowing the oppositely positioned helical surfaces 44 on the connector ring and helical surfaces 45 on the male element to mesh thereby forcing the male element axially forward into the inner face of the connector housing.

At the end of each helical tooth or wedge tooth is located a stop lug 47 This stop lug 47 is positioned so that the opposite corresponding tooth can only mesh to a given position. This stop lug 47 further prohibits the connector ring 13 from being turned completely around while the teeth are meshed.

Having described the essential elements of the invention, the operation and assembly of the connector will be easily understood by one skilled in the art. When a male element 32 is inserted in the bore 16 of the manifold connector 10, the connector ring 13 is rotated until the teeth 43 of the ring 13 and the teeth 46 of the male element 32 mesh. The operator can easily rotate the ring 13 until the teeth begin to mesh. In order to fully mesh the teeth, a force may be applied to the impact lugs 38.

The meshing or wedging action of the teeth causes the male element 32 to move forward axially until the male element 32 seats on the outer seal 28 of the seal ring 12. The forward thrust of the male element 32 on the seal ring 12 forces the inner seal 30 in the seal ring to seat against the flange surface 34. It can easily be seen also that in a sideways torsional or building load will act in such a way to inforce sealing since separate seals are always in contact with the elastomeric portion of the sealing means.

The forward axial thrust of the male member 32 is counteracted by the opposite axial movement of the manifold connector 10. This movement causes the inner edges 26 of the gripping lugs 15 to seat against the outer surface of the manifold flange 21.

When the inner surface of the side gripping lugs 15 are properly seated on the flange 21, the locking support pads 29 seat on the under edge of the manifold flange 21. The combination of the forward axial thrust of the seal ring 12 coacting with the male element 32 and the reverse axial thrust of the connector 10 being pulled to the back of the flange, and the seat of the locking support pads 29 hold the manifold connector firmly onto the flange. Any leakage is prevented because of deformation of the "O" rings 28 and 28a on the opposite ends of the seal ring.

Since axial thrust can be provided by coaction of any wedge shaped surface pulling against another, wedged shaped teeth could be used in place of the helical shaped teeth.

Other adaptations of this invention and other variations as embodied herein could be applied to other elements common in the art of coupling structures. For example, the same elements can be utilized to convert conventional threaded hose end portions 51 to accommodate this quick connecting coupling. To do so, one may dispose male 51 and female 53 nipple extenders to either threaded 51 or bolted flange hose end portions. To do so one may thread onto a threaded end portion 51 a male nipple extender 51 having teeth and stops disposed on the outer circumference. Correspondingly, female nipple extenders 53 may also be threaded onto provided hose end supports by providing a connector ring 13 around the threaded female nipple extender 53. The connector ring similarly would have corresponding teeth on the inner peripheral surface and a stop pin to coact with the stop slots. In this way, hose with conventional hose end elements could be converted to the coupler as embodied herein. The male element thereby fitted onto the hose end could be inserted into the female element and the ring thereby coacting with the teeth and coaxial thrust of the male element against a seal ring located in a shoulder inside the female element. Obviously, male nipples 55 and female nipples 56 utilizing these elements could also be built into hose ends or flanged male nipples 57 and flanged female nipples 58 could be bolted onto flanged hose ends.

In the inner bore 59 of the female element 58 at the end opposite the connector ring 13 is a seal ring seat 60 comprising an annular shoulder 61 extending radially inward toward the axis of the bore of the female element 56. A suitable sealing means such as an elastometric ring 62 can be disposed around the seat 60. Upon meshing of the male element 57 into the female element 58, the engagement of the teeth will cause axial motion of the male element 57 forcing the end 63 of the male element 57 to seal against the sealing means 62.

Conventionally, if one wishes to stop the end portion of a hose end, blind flanges are bolted onto such hose ends. Such stops, however, can quickly and easily be accomplished by elements utilizing this invention. For instance, tubular shapes may be utilized whereby teeth 64 and stops 40 could be disposed from the tube to fit into nipples embodying this invention. This device, therefore, would act as a plug 65 for a female element built into the hose. Conversely, to stop a hose end utilizing the male element, a cap 66 could be utilized whereby a connector ring 67 is disposed from the neck 68 and the connector ring 67 engaged with the teeth 64 from the male nipple connected to the hose end.

Accordingly, the foregoing detailed descriptions have been given for purposes of illustration only and are not intended to limit the scope of the present invention which is to be determined from appended claims.

I claim:

1. In combination with a nipple secured to the end portion of a conduit and a flange extending radially outward from a free end of a second conduit, the improvement of a manifold connector assembly for coacting said nipple and said flange into axial bias into said connector, said connector comprising:
   a substantially cylindrical housing having an inner bore;
   a connector ring neck integrally attached and disposed on one end of said housing;
   a rotatable connector ring secured axially around said ring neck, said connector ring having an inner surface;
   a plurality of connector teeth disposed radially inward around the inner surface of the connector ring;
   a flange-receiving a plurality of connector teeth on the nipple for engaging face disposed in the end of the housing opposite the end on which said connector ring is disposed;
   an annular groove disposed in said flange-receiving face of the connector housing adjacent to the inner bore;
   sealing means freely disposed in the annular groove; and
   connector means disposed on the outer peripheral circumference of the connector housing at the end opposite the connector ring neck for securing said manifold connector to said flange said nipple and said flange being connected to said cylindrical housing whereby the free end of the nipple and the end face of the flange are sealingly biased by said sealing means.

2. The combination according to claim 1 in which the connector means comprises a plurality of arcuate connector lugs.

3. The combination according to claim 2 in which the connector lugs have gripping edges, two of said lugs being diametrically opposite and having locking support pads disposed on the gripping edges.

4. The combination according to claim 1 in which the connecting means comprises a substantially hemispherical, arcuate lug.

5. The combination according to claim 1 in which the sealing means has axial end surfaces having deformable sealing rings disposed such that the deformable sealing ring in one end is biased against the free end of the nipple and the deformable ring on the other end is biased against the flange.

6. The combination according to claim 1 in which the connector ring has disposed from its outer periphery a plurality of impact lugs.

7. The combination according to claim 1 in which locking pins are disposed on the outer periphery of the connector ring and spaced locking fins are disposed on the outer peripheral surface of the nipple; said locking fins oriented in a position such that when the pins are biased toward the nipple, said pins are disposed in the spaces between the locking fins.

8. The combination according to claim 1 in which the nipple has a plurality of connector teeth radially disposed from its outer peripheral surface; said connector teeth having contact surfaces complimentary to contact surfaces of said connector teeth disposed around the inner surface of said connector ring such that axial sealing force is imparted relative to said manifold connector and said nipple when said connector ring is rotated and the contact surfaces of the teeth are meshed.

9. The combination according to claim 1 in which the connector teeth of said connector ring have terminal ends, stop lugs are disposed from said terminal ends in such a disposition that the stop lugs will come into contact with the leading edge of the connector teeth of the nipple.

10. In combination with a nipple secured to the end portion of a conduit and a flange extending radially outward from a free end of a second conduit, the improvement of a manifold connector assembly for coacting said nipple and said flange into bias into said connector, said connector comprising:

- a substantially cylindrical housing having an inner bore;
- an axially and integrally connector ring neck disposed on one end of said housing;
- a rotatable connector ring secured axially around said connector ring neck, said connector ring having an inner surface;
- a plurality of connector teeth disposed radially inward around the inner surface of the connector ring for engaging a plurality of connector teeth on the nipple;
- a plurality of notches in the inward circumference of said connector ring for receiving said nipple connector teeth within said connector ring;
- a flange-receiving face disposed in the end of the housing opposite the end on which said connector ring is disposed;
- an annular groove disposed in said flange-receiving face of the connector housing adjacent to the inner bore;
- sealing means freely disposed in the annular groove; and
- connector means disposed on the outer peripheral circumference of the connector housing at the end opposite the connector ring neck for securing said manifold connector to said flange said nipple and said flange being connected to said cylindrical housing whereby the free end of the nipple and the end face of the flange are sealingly biased by said sealing means.